: US 9,030,856 B2
(45) Date of Patent: May 12, 2015

(12) United States Patent
Kamata (54) HIGH VOLTAGE INVERTER DEVICE AND ELECTRICAL LEAKAGE DETECTOR THEREOF (75) Inventor: Hisahiro Kamata, Iwanuma (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 13/329,588

(22) Filed: Dec. 19, 2011

(65) Prior Publication Data

US 2012/0163058 A1 Jun. 28, 2012

(30) Foreign Application Priority Data

Dec. 28, 2010 (JP) ................. 2010-293335

(51) Int. Cl.
H02M 3/335 (2006.01)
H02M 7/537 (2006.01)
H02H 3/33 (2006.01)
H01F 38/40 (2006.01)
H02H 7/122 (2006.01)
H02M 1/12 (2006.01)

(52) U.S. Cl.
CPC ............ H02M 7/537 (2013.01); H02H 3/33 (2013.01); H02H 7/1227 (2013.01); H02M 2001/123 (2013.01)

(58) Field of Classification Search
CPC ......... H02M 1/32; G01R 19/00; G01R 15/18; H01H 71/125
USPC ........ 363/97, 131, 20, 21.01, 21.12; 336/170, 336/173, 183, 184, 185; 324/127
See application file for complete search history.

(56) References Cited

U.S. PATENT DOCUMENTS 4,977,301 A 12/1990 Maehara et al.
5,177,675 A 1/1993 Archer
7,365,501 B2 * 4/2008 Ushijima et al. .............. 315/278
(Continued)

FOREIGN PATENT DOCUMENTS

DE 42 34 725 A1 4/1993
EP 1385360 B1 * 9/2010
(Continued)

OTHER PUBLICATIONS

Murata ("5500 Series," Datasheet, Murata Power Solutions, Inc., 2008).*

(Continued)

Primary Examiner — Matthew Nguyen
Assistant Examiner — Jye-June Lee
(74) Attorney, Agent, or Firm — Westerman, Hattori, Daniels & Adrian, LLP (57) ABSTRACT In a high voltage inverter device switching an input voltage to apply an exciting current to an excitation winding of a transformer and output an alternating-current high voltage from an output winding to supply the high voltage to a load from output lines, a point on the output line is connected to a frame ground. Each of a first and a second winding of the electrical leakage detecting transformer is interposed in series with the output line on a side where current flows out of the point and a side where current flows into the point respectively. A detection voltage Vd outputted from an amplifying winding is compared by a comparison voltage Vref, and an electrical leakage detection signal Sd is outputted when Vd>Vref. The first and second winding are opposite in winding direction to each other and equal in number of turns.

8 Claims, 4 Drawing Sheets (56) References Cited

U.S. PATENT DOCUMENTS

| | | | |
|---|---|---|---|
| 8,139,759 B2* | 3/2012 | Ichihara et al. | 307/90 |
| 2005/0099143 A1 | 5/2005 | Kohno | |
| 2009/0154202 A1* | 6/2009 | Takatsuka et al. | 363/40 |
| 2009/0251055 A1 | 10/2009 | Kimura | |
| 2010/0109648 A1* | 5/2010 | Cheung | 336/170 |

FOREIGN PATENT DOCUMENTS

| | | |
|---|---|---|
| JP | 02-158086 A | 6/1990 |
| JP | 07-063806 A | 3/1995 |
| JP | 9-065564 A | 3/1997 |
| JP | 9-182449 A | 7/1997 |
| JP | 10-232259 A | 9/1998 |
| JP | 11-237813 A | 8/1999 |
| JP | 2000-050632 A | 2/2000 |
| JP | 2001-333582 A | 11/2001 |
| JP | 2006-093469 A | 4/2006 |
| JP | 2006-127789 A | 5/2006 |
| JP | 2008-99505 A | 4/2008 |
| JP | 2008-186615 A | 8/2008 |
| WO | WO9714205 A1 * | 4/1997 |
| WO | 2007/117011 A1 | 10/2007 |

OTHER PUBLICATIONS

7400DB0701 ("Loading Consideration When Paralleling Transformers," Application Guide, Schneider Electric USA, 2007).*

H.S. Choi, "Transformer Design Consideration for Offline Flyback Converters Using Fairchild Power Switch (FPS)," Fairchild Semiconductor Corp., 2004.*

Michael Tao Zhang, "Electrical, Thermal, and EMI Designs of High-Density, Low-Profile Power Supplies," Dissertation, Virginia Polytechnic Institute and State University, Chapter 3, pp. 73-113, 1998.*

German Search Report dated Aug. 6, 2012, issued in corresponding German Patent Application No. 102011090037.3 (5 pages).

Japanese Notification of Reason(s) for Refusal dated Dec. 24, 2013, issued in corresponding Japanese Patent Application No. 2010-293335 (5 pages). (The English translation is available to the U.S. PTO through the Dossier Access System.).

Japanese Notification of Reason(s) of Refusal dated Jun. 3, 2014, issued in corresponding Japanese Patent Application No. 2010-293335 (3 pages).

* cited by examiner

HIGH VOLTAGE INVERTER DEVICE AND ELECTRICAL LEAKAGE DETECTOR THEREOF

BACKGROUND OF THE INVENTION

1. Field of the Invention

The invention relates to an electrical leakage detector for an output in a high voltage inverter device such as a switching regulator, an inverter or the like used in a high voltage power supply unit, a power supply unit for discharge or the like, and a high voltage inverter device including the electrical leakage detector.

2. Description of the Related Art

To supply a high voltage to various devices such as a discharge tube for a large-size plasma display, a plasma generator and the like, a high voltage inverter device such as a switching regulator or the like is used.

Generally, an inverter device with an output power value of about several W is often used, while a high voltage inverter device having an alternating-current output with an output voltage of over ten KV and a power value of several tens W or higher is used for the plasma generator or the like.

Such a high voltage inverter device having an alternating-current output of over ten KV is apt to discharge because the output is alternating-current at a high voltage and the discharge to the surrounding of the output line is dielectric discharge. Therefore, it is necessary to install the high voltage inverter device in an environment where it hardly discharges, but the output current needs to return through one path when returning to a frame ground such as a casing of the inverter or the like passing through a load.

Leakage (electrical leakage) of a high voltage along a power feeding path to the load due to an abnormal discharge or the like not only decreases the power supplied to the load but also possibly causes a serious problem on a human body due to electrical shock or causes ignition to lead to a fire. Therefore, it is necessary to constantly monitor the output voltage or current of the inverter to detect abnormality such as electrical leakage or the like and stop the operation of the inverter to thereby avoid danger.

Conventionally, in an inverter for lighting a discharge lamp, the voltage at an output end is detected and compared to the voltage at normal time to detect occurrence of abnormal discharge or the like. For example, as described in JP 2008-186615 A, the voltage on the output side of an inverter is divided by a resistor and the divided voltage is rectified and smoothed to detect the peak value or the effective value of the output voltage of the inverter. This value is compared to the normal value to monitor the presence or absence of abnormal discharge so that when abnormal discharge is detected, the operation of the inverter is stopped.

SUMMARY OF THE INVENTION

However, it is unreasonable to detect the output voltage in the above-described manner in the high voltage inverter device having an alternating-current output with an output voltage of over ten KV in terms of the withstand voltage and insulating structure of parts. If such detection is implemented, the high voltage inverter device becomes a large scale and large size and does not meet the needs in terms of cost and space.

Hence, it was tried to monitor the output status through the variation in input power into the high voltage inverter device, but the output status could not be grasped accurately through the variation in input power.

The invention has been made to solve the above problems, and its object is to provide an electrical leakage detector small in size and low in cost capable of surely detecting electrical leakage along an output path of a high voltage inverter device, and a safety high voltage inverter device including the electrical leakage detector.

An electrical leakage detector according to the invention is an electrical leakage detector of a high voltage inverter device, the high voltage inverter device being configured to switch an input voltage that is a DC voltage or a voltage composed of a DC component with a pulsating current superposed thereon to apply an exciting current to an excitation winding of a transformer and output an alternating-current high voltage from an output winding of the transformer so as to supply the alternating-current high voltage to a load from a pair of output terminals to which both ends of the output winding are connected via output lines respectively, and the output line between one of the ends of the output winding and one of the output terminals being connected to a frame ground.

To achieve the above object, the electrical leakage detector is composed of an electrical leakage detecting transformer and a comparison circuit.

The electrical leakage detecting transformer includes a first winding interposed in series with the output line on a side where current flows out of a point connected to the frame ground, a second winding interposed in series with the output line on a side where current flows into the point connected to the frame ground, and an amplifying winding, the first winding and the second winding are opposite in winding direction to each other and equal in number of turns, and a number of turns of the amplifying winding is larger than numbers of turns of the first and second windings by one order or more.

The comparison circuit compares a detection voltage outputted from between both terminals of the amplifying winding of the electrical leakage detecting transformer to a comparison voltage set in advance, and outputs an electrical leakage detection signal when the detection voltage exceeds the comparison voltage.

A high voltage inverter device according to the invention is a high voltage inverter device including a transformer having an excitation winding and an output winding, a switching element switching a circuit applying an input voltage that is a DC voltage or a voltage composed of a DC component with a pulsating current superposed thereon to the excitation winding to apply an exciting current to the excitation winding, and a control circuit controlling the switching element, and configured to output an alternating-current high voltage from the output winding so as to supply the alternating-current high voltage to a load from a pair of output terminals to which both ends of the output winding are connected via output lines respectively, and the output line between one of the ends of the output winding and one of the output terminals being connected to a frame ground.

To achieve the above object, the high voltage inverter device includes: an electrical leakage detecting transformer including a first winding and a second winding opposite in winding direction to each other and equal in number of turns, and an amplifying winding having a number of turns larger than numbers of turns of the first and second windings by one order or more; and a comparison circuit comparing a detection voltage outputted from between both terminals of the amplifying winding of the electrical leakage detecting transformer to a comparison voltage set in advance, and outputting an electrical leakage detection signal when the detection voltage exceeds the comparison voltage.

The first winding of the electrical leakage detecting transformer is interposed in series with the output line on a side where current flows out of a point connected to the frame ground, and the second winding is interposed in series with the output line on a side where current flows into the point connected to the frame ground, and the electrical leakage detection signal outputted from the comparison circuit is inputted into the control circuit, and the control circuit stops a switching operation of the switching element when the electrical leakage detection signal is inputted.

It is preferable that in any of the above-described electrical leakage detecting transformers, the number of turns of each of the first winding and the second winding is one turn to several turns (preferably, one turn or two turns) and the number of turns of the amplifying winding is several hundred turns to several thousand turns (preferably, one hundred turns to ten thousand turns, more preferably, one thousand turns to three thousand turns).

Further, the transformer generating the high voltage may be composed of a plurality of individual resonant transformers having same characteristics, excitation windings of the plurality of resonant transformers may be connected in parallel or in series to be simultaneously excited, and output windings of the plurality of resonant transformers may be connected in series or in parallel with each other.

In this case, it is desirable that time axes of output voltage waveforms of the output windings of the plurality of resonant transformers are in synchronization.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments to carry out the invention will be concretely described based on the drawings.

First Embodiment

Figure 1:
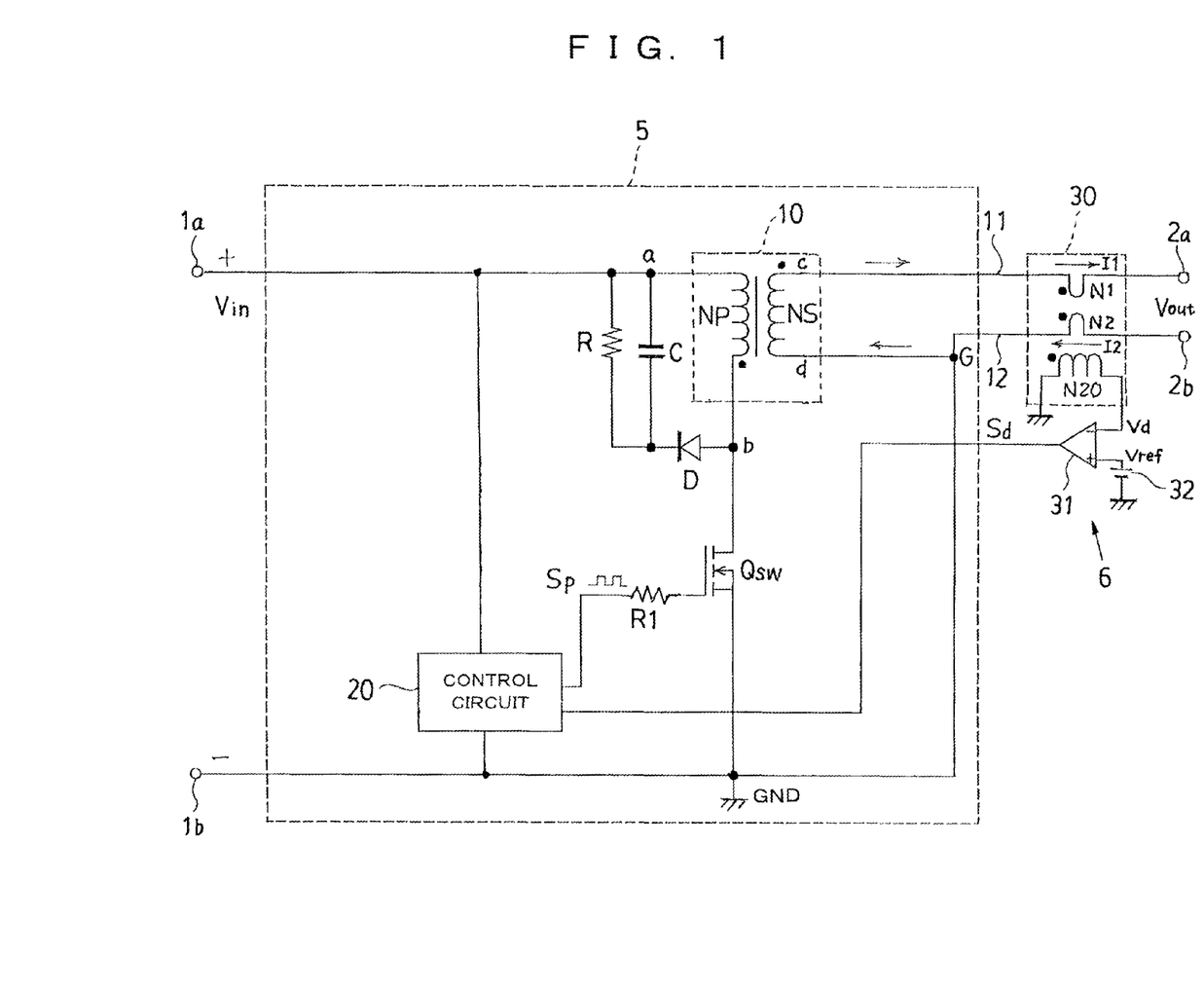
FIG. 1 is a circuit diagram illustrating a first embodiment of a high voltage inverter device including an electrical leakage detector according to the invention.

FIG. 1 is a circuit diagram illustrating a first embodiment of a high voltage inverter device including an electrical leakage detector according to the invention.

The high voltage inverter device includes a high voltage inverter 5, an electrical leakage detector 6, input terminals 1a, 1b, and output terminals 2a, 2b.

The high voltage inverter 5 switches an input voltage Vin that is a DC voltage or a voltage composed of a DC component with a pulsating current superposed thereon, which is supplied from the input terminal 1a, 1b, by a switching element Qsw to apply an exciting current to an excitation winding NP on the primary side of a transformer 10 that is a resonant transformer and output an alternating-current high voltage of over ten KV from an output winding NS on the secondary side of the transformer 10 so as to output an output voltage Vout being the high voltage from the output terminals 2a, 2b to a not-illustrated load. It is preferable that the input voltage Vin is a voltage within Safety Extra Low Voltage (SELV).

The excitation winding NP of the transformer 10 has one end connected to the input terminal 1a on the positive electrode side and the other end connected to the input terminal 1b on the negative electrode side through between the drain and the source of the switching element Qsw composed of an FET. The output winding NS has one end c connected to the output terminal 2a by an output line 11 and the other end d connected to the output terminal 2b by an output line 12.

The output line 12 is connected, at its middle point G, to a frame ground GND composed of a casing or chassis made of a conductor or a frame or the like. Further, the input terminal 1b on the negative electrode side and the source side of the switching element Qsw are also connected to the frame ground GND.

In the output lines 11, 12, a first winding N1 and a second winding N2 of an electrical leakage detecting transformer are interposed respectively. It is desirable to earth (ground) the frame ground GND for safety.

20 denotes a control circuit including an oscillation circuit and is formed as an IC (integrated circuit). The control circuit 20 operates by the input voltage Vin supplied from the input terminals 1a, 1b and applies a switching pulse Sp to the gate of the switching element Qsw via a resistor R1 to turn ON/OFF the switching element Qsw. Thereby, current is intermittently applied through the excitation winding NP of the transformer 10 to generate an alternating-current high voltage in the output winding NS. Between an a point on the positive electrode side of the input power supply and a b point on the positive electrode side of the switching element Qsw, a parallel circuit composed of a capacitor C having one end connected to the a point and a resistor R is connected in series with a diode D having the anode connected to the b point to constitute a snubber circuit. The snubber circuit is provided for resetting the transformer 10 and for suppressing the voltage of the switching element Qsw.

The electrical leakage detector 6 is composed of an electrical leakage detecting transformer 30, a comparison circuit (comparator) 31, and a reference power supply 32.

The electrical leakage detecting transformer 30 has the first winding N1 interposed in series with the output line 11 on the side where current flows out of the G point that is the point connected to the frame ground GND, the second winding N2 interposed in series with the output line 12 on the side where current flows into the G point, and an amplifying winding N20.

The first winding N1 and the second winding N2 are opposite in winding direction to each other and equal in the number of turns, and the number of turns of the amplifying winding N20 is larger than the numbers of turns of the first and second windings N1, N2 by one order or more, more preferably, two orders or more. For example, it is preferable to set the numbers of turns of the first and second windings N1, N2 to one turn to several turns (preferably, one turn or two turns) and set the number of turns of the amplifying winding N20 to several hundred turns to several thousand turns (preferably, one hundred turns to ten thousand turns, more preferably, one thousand turns to three thousand turns).

A detection voltage Vd outputted from between both terminals of the amplifying winding N20 of the electrical leakage detecting transformer 30 is compared by the comparison circuit 31 to a comparison voltage Vref set in advance by the reference power supply 32 so that when the detection voltage Vd exceeds the comparison voltage Vref, the comparison circuit 31 inverts the output and outputs an electrical leakage detection signal Sd (a signal at a low level).

A current I1 which will flow out to the load flows through the first winding N1 of the electrical leakage detecting transformer 30 and a current I2 returned through the load flows through the second winding N2. When these output currents flow only on a predetermined current path for feeding power to the load, the currents I1 and I2 are equal in magnitude, so that magnetic fluxes generated by the first winding N1 and the second winding N2 opposite in winding direction are cancelled out each other and never induce any voltage across the amplifying winding N20.

However, if unintended discharge occurs along the current path between the output terminals 2a and 2b to cause electrical leakage, the return current I2 becomes less than the flowing-out current I1, resulting in that the magnetic fluxes generated by the first winding N1 and the second winding N2 are not cancelled out each other any longer. The differential magnetic flux between them induces a voltage amplified by the amplifying winding N20 having a turns ratio to the first winding N1 or the second winding N2 of several hundred times to several thousand times.

The amplifying winding N20 has one end also connected to the frame ground GND and the other end from which the detection voltage Vd is outputted and compared by the comparison circuit 31 to the comparison voltage Vref set in advance.

Then, when the detection voltage Vd exceeds the comparison voltage Vref (Vd>Vref is established), which is regarded as occurrence of electrical leakage, the comparison circuit 31 inverts the output (from positive to negative in this example) and outputs the inverted output as the electrical leakage detection signal Sd and inputs it to the control circuit 20 of the high voltage inverter 5.

When the electrical leakage detection signal Sd is inputted, the control circuit 20 stops the generation of the switching pulse Sp to stop the switching operation of the switching element Qsw. Therefor, the operation of the high voltage inverter 5 is stopped.

Note that the electrical leakage detector 6 may be configured to operate a buzzer or the like to issue a warning, or light or blink a warning lamp according to the electrical leakage detection signal Sd outputted from the comparison circuit 31.

Figure 2A:
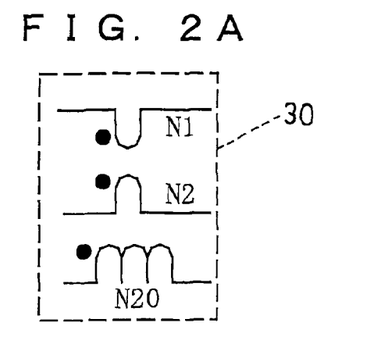
FIG. 2A is a circuit symbol diagram illustrating a configuration of an electrical leakage detecting transformer in FIG. 1.
Figure 2B:
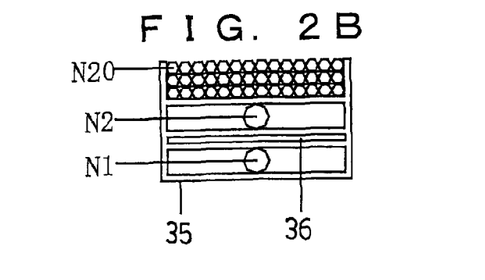
FIG. 2B is a sectional view of a winding part thereof.
Figure 3A:
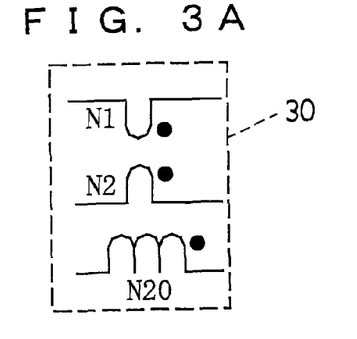
FIG. 3A is a circuit symbol diagram illustrating another configuration of an electrical leakage detecting transformer in FIG. 1.
Figure 3B:
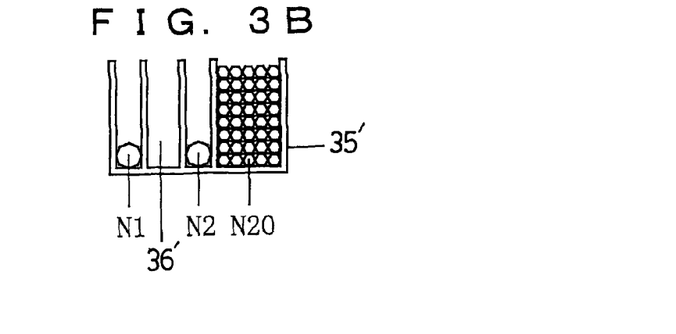
FIG. 3B is a sectional view of a winding part thereof.

FIG. 2A, FIG. 2B and FIG. 3A, FIG. 3B illustrate different configurations of the electrical leakage detecting transformer, FIG. 2A, FIG. 3A being a circuit symbol diagram thereof and FIG. 2B, FIG. 3B being a sectional view of one side portion of a window frame of a bobbin of a winding part.

In FIG. 2B, 35 denotes a bobbin made of an insulating material mounted on a core whose illustration is omitted, in which the first winding N1 is wound one turns or several turns from the lower side in the drawing, a space 36 for preventing discharge in the transformer is provided, and the second winding N2 is wound in the opposite direction to and the same times as those of the first winding N1 on the space 36. The amplifying winding N20 is wound several hundred turns to several thousand turns on the second winding N2 with insulation between them. Each of the windings is illustrated by a circular section.

FIG. 3B illustrates a configuration made by rotating the configuration of FIG. 2B 90 degrees clockwise, in which insulating walls of a bobbin 35' exist between the windings and the first winding N1, a space 36' for preventing discharge in the transformer, the second winding N2, and the amplifying winding N20 are arranged in this order from the left side in the drawing. Winding is easier in this configuration.

The illustration of the shape of the core is omitted in the drawings because the core only needs to be disposed to interlink the windings therewith (at 90 degrees to the winding direction).

In the case of using such an electrical leakage detecting transformer 30, when a difference occurs between the magnitudes of the currents flowing through the first winding N1 and the second winding N2, the amplified voltage by the amplifying winding N20 is induced, so that when electrical leakage is caused by abnormal discharge or the like somewhere on the power feeding path from the high voltage inverter to the load, the electrical leakage can be surely detected.

The electrical leakage detecting transformer 30 is preferably provided as close as possible to the output end of the high voltage inverter 5 and may be provided inside the high voltage inverter 5.

Further, the electrical leakage detecting transformer 30 easily obtains an insulation voltage to a high voltage and can be embodied at a relatively low cost without greatly increasing in size.

Second Embodiment

Figure 4:
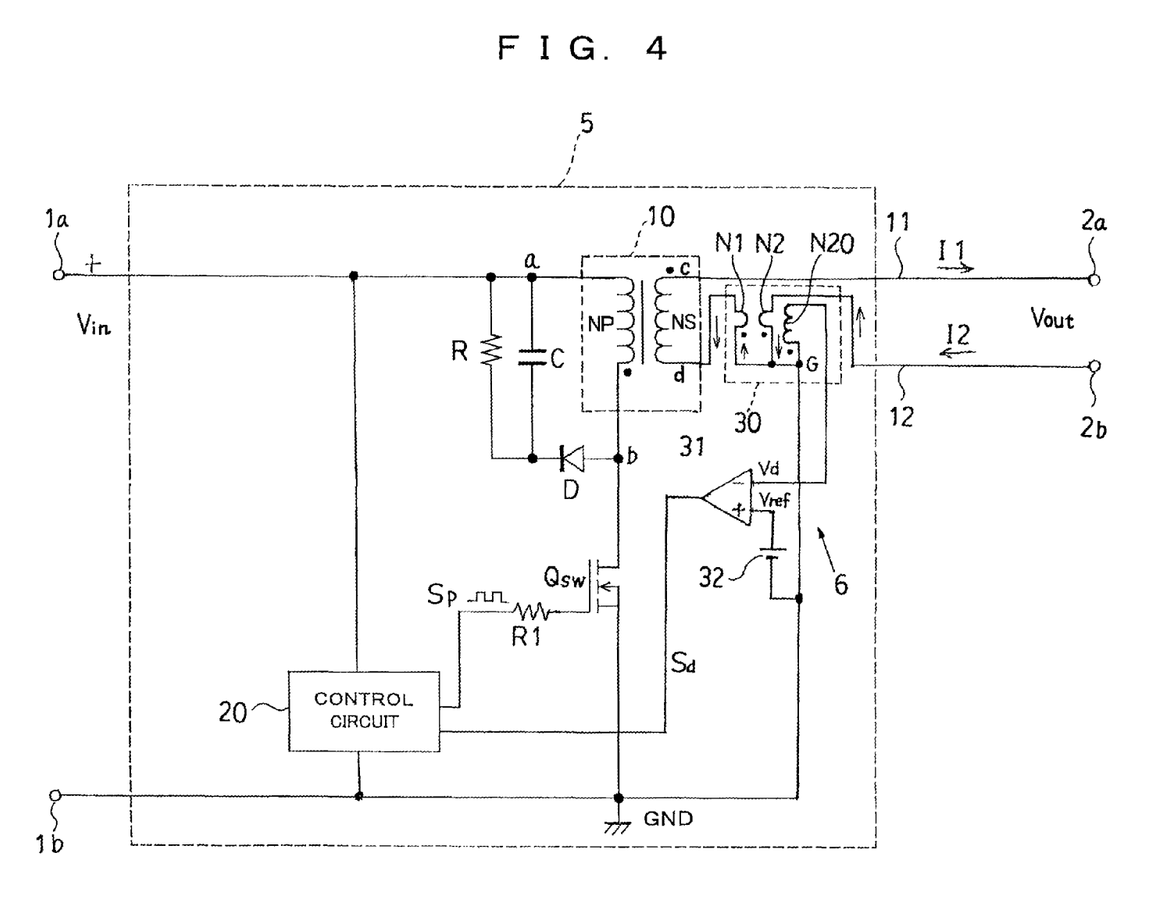
FIG. 4 is a circuit diagram illustrating a second embodiment of a high voltage inverter device including an electrical leakage detector according to the invention.

Next, a second embodiment of a high voltage inverter device including an electrical leakage detector according to the invention will be described with FIG. 4. In FIG. 4, the same numerals or letters are given to portions corresponding to those in FIG. 1 and description thereof will be omitted.

The second embodiment is different from the first embodiment only in that an electrical leakage detector 6 is provided inside a high voltage inverter 5. Further, a first winding N1 of an electrical leakage detecting transformer 30 is interposed in an output line between a G point connected to a frame ground GND of an output line 12 and an end portion d of an output winding NS of a transformer 10, and a second winding N2 is interposed at a portion close to the G point in the output line 12 between the G point and an output terminal 2b. The other circuit configuration is the same as that of the first embodiment in FIG. 1.

Even in this configuration, current which will flow out from the G point connected to the frame ground GND (the same as a current I1 flowing out to the load) flows through the first winding N1 of the electrical leakage detecting transformer 30, and current which will flow into the G point (the same as a current I2 returned through a load) flows through the second winding N2. When these output currents flow only on the predetermined current path for feeding power to the load, the current flowing through the first winding N1 and the current flowing through the second winding N2 are equal in magnitude, so that magnetic fluxes generated by the first winding N1 and the second winding N2 opposite in winding direction are cancelled out each other and never induce any voltage across an amplifying winding N20.

However, if unintended discharge occurs somewhere on the current path including the output lines 11, 12 to cause electrical leakage, the current flowing through the second winding N2 decreases, resulting in that the magnetic fluxes generated by the first winding N1 and the second winding N2 are not cancelled out each other any longer. The differential magnetic flux between them induces a voltage amplified by the amplifying winding N20 according to the turns ratio between the amplifying winding N20 and the first winding N1 or the second winding N2.

A detection voltage Vd is compared by a comparison circuit 31 to a comparison voltage Vref set in advance by a reference power supply 32 so that when the detection voltage Vd exceeds the comparison voltage Vref, the comparison circuit 31 inverts the output and outputs an electrical leakage detection signal Sd (a signal at a low level). The signal Sd causes the control circuit 20 to stop the operation of the high voltage inverter 5.

According to this embodiment, abnormal discharge (electrical leakage) inside the transformer 10 can also be detected. When abnormal discharge occurs inside the transformer 10, a temporary difference is generated in phase of alternating-current waveform between the outputted current I1 and the returned current I2, resulting in that the magnetic fluxes generated by the first winding N1 and the second winding N2 at this time are not cancelled out each other any longer to induce a voltage amplified by the amplifying winding N20 according to the turns ratio between the amplifying winding N20 and the first winding N1 or the second winding N2, and output the detection voltage Vd.

Further, the insulation voltages between each of the first winding N1, the second winding N2 and the amplifying winding N20 of the electrical leakage detecting transformer 30 can be reduced. The electrical leakage detecting transformer 30 can be provided inside the transformer 10.

Third Embodiment

Figure 5:
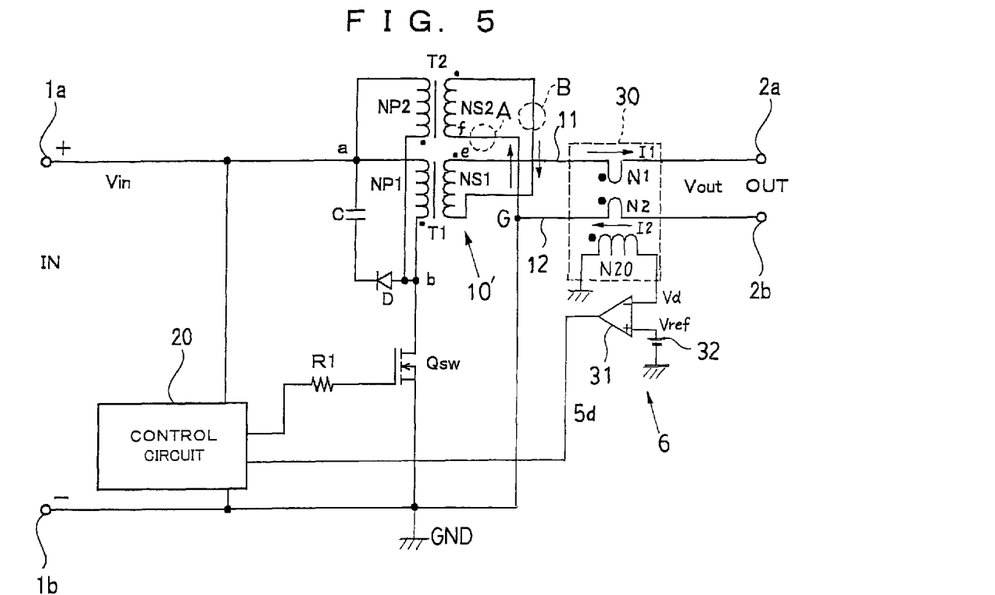
FIG. 5 is a circuit diagram illustrating a third embodiment of a high voltage inverter device including an electrical leakage detector according to the invention.

Next, a third embodiment of a high voltage inverter device including an electrical leakage detector according to the invention will be described with FIG. 5. Also in FIG. 5, the same numerals or letters are given to portions corresponding to those in FIG. 1 and description thereof will be omitted.

In the third embodiment, a transformer 10' generating a high voltage is composed of two resonant transformers T1, T2 having the same configuration and the same characteristics. Excitation windings NP1, NP2 of the resonant transformers T1, T2 are connected in parallel between an a point on the positive electrode side of the input power supply and a b point on the positive electrode side of a switching element Qsw composed of an FET.

The resonant transformers T1, T2 include output windings NS1, NS2 respectively, and the output winding NS1 and the output winding NS2 are connected in series such that the output winding NS1 of the resonant transformer T1 is stacked on the output winding NS2 of the resonant transformer T2, and end portions e, f of the output windings NS1, NS2 which are not connected to each other lead to the output terminals 2a, 2b via the output lines 11, 12 respectively. Note that a snubber circuit in this embodiment is composed of a series circuit composed of a capacitor C and a diode D with the resistor R in FIG. 1 and FIG. 2 omitted.

The high voltage inverter device in this embodiment simultaneously excites the excitation windings NP1, NP2 of the two resonant transformers T1, T2 constituting the transformer 10' each of which has separate and independent core with completely different magnetic path and has the same characteristic, to synchronize the time axes of the output voltage waveforms of the output windings NS1, NS2 on the output side, and adds or multiplies the respective output voltages.

Therefore, the number of output windings can be increased without occurrence of biased magnetization in a plurality of excitation windings, so that a high voltage at a high boost ratio can be obtained continuously, stably, and safely.

Note that it is preferable that the time axes of the output voltage waveforms of the output windings NS1, NS2 of the resonant transformers T1, T2 are synchronized. To this end, it is preferable to arrange the switching element Qsw so that the wiring distances between the drain terminal of the switching element Qsw and the negative electrode side terminals of the excitation windings NP1, NP2 are equal.

Further, the output line 12 connecting the end portion f of the resonant transformer T2 and the output terminal 2b is connected to a frame ground GND at a G point. Further, as in the first embodiment illustrated in FIG. 1, an electrical leakage detecting transformer 30, a comparison circuit 31, and a reference power supply 32 constitute an electrical leakage detector 6. A first winding N1 of the electrical leakage detecting transformer 30 is interposed in the output line 11 to pass a flowing-out current I1, and a second winding N2 is interposed in the output line 12 between the G point and the output terminal 2b to pass a flowing-in current I2, whereby a detection voltage Vd according to the difference between the currents I1 and I2 can be obtained from an amplifying winding N20 at occurrence of electrical leakage.

It is also similar to the above-described embodiments that the detection voltage Vd is compared by the comparison circuit 31 to a comparison voltage Vref so that when the detection voltage Vd exceeds the comparison voltage Vref, the comparison circuit 31 outputs an electrical leakage detection signal Sd to cause the control circuit 20 to stop the operation of the high voltage inverter.

Note that the first winding N1 of the electrical leakage detecting transformer 30 may be interposed anywhere in a path through which the current flows from the G point connected to the frame ground GND to the output terminal 2a. For example, the first winding N1 may be interposed in a line indicated with a broken circle A or B in FIG. 5.

Fourth Embodiment

Figure 6:
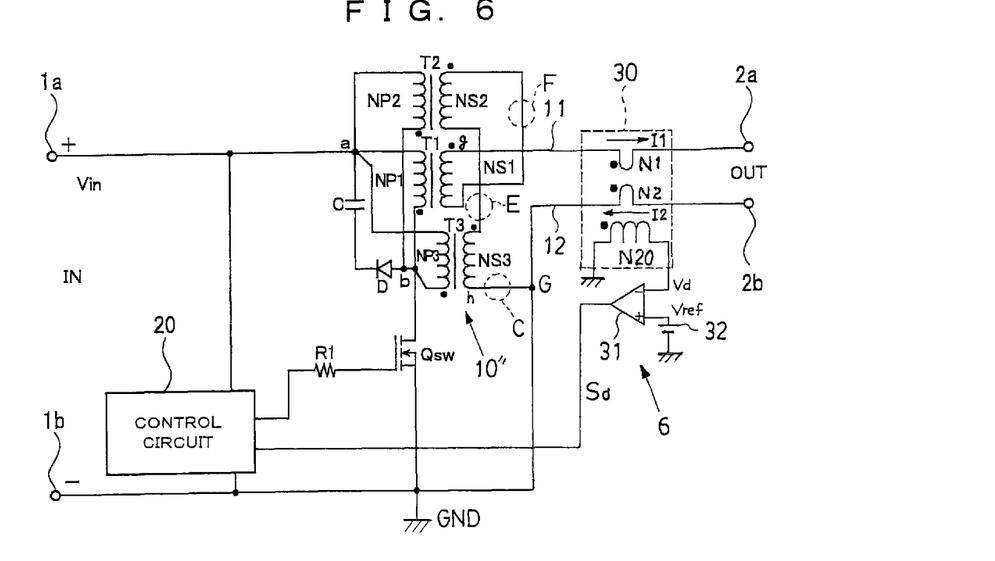
FIG. 6 is a circuit diagram illustrating a fourth embodiment of a high voltage inverter device including an electrical leakage detector according to the invention.

Next, a fourth embodiment of a high voltage inverter device including an electrical leakage detector according to the invention will be described with FIG. 6. In FIG. 6, the same numerals or letters are given to portions corresponding to those in FIG. 1 and FIG. 5 and description thereof will be omitted.

In the fourth embodiment, a transformer 10" generating a high voltage is composed of three resonant transformers T1, T2, T3 having the same configuration and the same characteristics.

Further, excitation windings NP1, NP2, NP3 of the resonant transformers T1, T2, T3 are connected in parallel between an a point on the positive electrode side of an input power supply and a b point on the positive electrode side of a switching element Qsw. All output windings NS1, NS2, NS3 of the resonant transformers T1, T2, T3 are connected in series such that end portions g, h of the output windings NS1, NS3 which are not connected to each other are connected to output terminals 2a, 2b via output lines 11, 12 respectively.

The high voltage inverter device in this embodiment simultaneously excites the excitation windings NP1, NP2, NP3 of the three resonant transformers T1, T2 T3 constituting the transformer 10" each of which has separate and independent core with completely different magnetic path and has the same characteristic, to synchronize the time axes of the output voltage waveforms of the output windings NS1, NS2, NS3 on the output side, and adds or multiplies the respective output voltages. Therefore, a higher voltage output and a larger output power can be supplied stably and safely.

Also in this case, it is preferable that the time axes of the output voltage waveforms of the output windings NS1, NS2, NS3 of the resonant transformers T1, T2, T3 are synchronized. To this end, it is preferable to arrange the switching element Qsw so that the wiring distances between the drain terminal of the switching element Qsw and the negative electrode side terminals of the excitation windings NP1, NP2, NP3 are equal.

Further, the output line 12 connecting the end portion h of the resonant transformer T3 and the output terminal 2b is connected to a frame ground GND at a G point. Further, as in the third embodiment illustrated in FIG. 5, an electrical leakage detecting transformer 30, a comparison circuit 31, and a reference power supply 32 constitute an electrical leakage detector 6. A first winding N1 of the electrical leakage detecting transformer 30 is interposed in the output line 11 to pass a flowing-out current I1, and a second winding N2 is interposed in the output line 12 between the G point and the output terminal 2b to pass a flowing-in current I2, whereby a detection voltage Vd according to the difference between the currents I1 and I2 can be obtained from an amplifying winding N20 at occurrence of electrical leakage.

It is also similar to the above-described embodiments that the detection voltage Vd is compared by the comparison circuit 31 to a comparison voltage Vref so that when the detection voltage Vd exceeds the comparison voltage Vref, the comparison circuit 31 outputs an electrical leakage detection signal Sd to cause the control circuit 20 to stop the operation of the high voltage inverter.

Note that the first winding N1 of the electrical leakage detecting transformer 30 may be interposed anywhere in a path through which the current flows from the G point connected to the frame ground GND to the output terminal 2a. For example, the first winding N1 may be interposed in any of lines indicated with broken circles C, E, F in FIG. 6.

A transformer generating a high voltage may be composed of four or more resonant transformers having the same characteristics. Further, excitation windings of a plurality of the resonant transformers may be connected in series or connected in combination of parallel and series. Their output windings may also be connected in parallel or connected in combination of series and parallel.

Though preferred embodiments of the high voltage inverter device according to the invention have been described above, the invention is not limited to the embodiments and may be variously changed.

The invention can be used for various high voltage generating devices such as a switching regulator, an inverter, a high voltage power supply, a power supply for discharge and so on.

What is claimed is:

1. An electrical leakage detector of a high voltage inverter device, said high voltage inverter device being configured to switch an input voltage to apply an exciting current to an excitation winding of a transformer and output an alternating-current high voltage from an output winding of the transformer so as to supply the alternating-current high voltage to a load from a pair of output terminals to which two ends of the output winding are connected via output lines respectively, and one of the output lines between one of the ends of the output winding and one of the output terminals being connected to a frame ground, said electrical leakage detector comprising:

an electrical leakage detecting transformer comprising a first winding interposed in series with said one of the output lines on a side where current flows out of a point connected to the frame ground, a second winding interposed in series with said one of the output lines on a side where current flows into the point connected to the frame ground, and an amplifying winding, said first winding and said second winding being opposite in winding direction to each other and equal in number of turns, and a number of turns of said amplifying winding being larger than the number of turns of said first and second windings by one order or more; and a comparison circuit comparing a detection voltage outputted from between two terminals of said amplifying winding of said electrical leakage detecting transformer to a comparison voltage set in advance, and outputting an electrical leakage detection signal when the detection voltage exceeds the comparison voltage, wherein in said electrical leakage detecting transformer, the number of turns of each of said first winding and said second winding is one turn or two turns and the number of turns of said amplifying winding is one hundred turns to ten thousand turns, and wherein said electrical leakage detecting transformer includes a bobbin made of an insulating material mounted on a core, in which said first winding and said second winding and said amplifying winding are wound to be insulated from each other, furthermore, a space for preventing discharge in said electrical leakage detecting transformer is provided between said first winding and said second winding through the bobbin, and said second winding and said amplifying winding are insulated by the bobbin.

2. The electrical leakage detector according to claim 1, wherein the number of turns of said amplifying winding is one thousand turns to three thousand turns.

3. The electrical leakage detector according to claim 1, wherein said first winding of said electrical leakage detecting transformer is interposed in said one of the output lines on a side where current flows out between the point connected to the frame ground and said one of the ends of the output windings, and said second winding of said electrical leakage detecting transformer is interposed in said one of the output lines on a side where current flows into between the point connected to the frame ground and one of the pair of the output terminals.

4. A high voltage inverter device comprising a transformer including an excitation winding and an output winding, a switching element switching a circuit applying an input voltage to the excitation winding to apply an exciting current to the excitation winding, and a control circuit controlling the switching element, and configured to output an alternating-current high voltage from the output winding so as to supply the alternating-current high voltage to a load from a pair of output terminals to which two ends of the output winding are connected via output lines respectively, and one of the output lines between one of the ends of the output winding and one of the output terminals being connected to a frame ground, said high voltage inverter device comprising:

an electrical leakage detecting transformer comprising a first winding and a second winding opposite in winding direction to each other and equal in number of turns, and an amplifying winding having a number of turns larger than the number of turns of said first and second windings by one order or more; and a comparison circuit comparing a detection voltage outputted from between two terminals of said amplifying winding of said electrical leakage detecting transformer to a comparison voltage set in advance, and outputting an electrical leakage detection signal when the detection voltage exceeds the comparison voltage, wherein said first winding of said electrical leakage detecting transformer is interposed in series with said one of the output lines on a side where current flows out of a point connected to the frame ground, and said second winding is interposed in series with said one of the output lines on a side where current flows into the point connected to the frame ground, wherein the electrical leakage detection signal outputted from said comparison circuit is inputted into said control circuit, and said control circuit stops a switching operation of the switching element when the electrical leakage detection signal is inputted, wherein in said electrical leakage detecting transformer, the number of turns of each of said first winding and said second winding is one turn or two turns and the number of turns of said amplifying winding is one hundred turns to ten thousand turns, and wherein said electrical leakage detecting transformer includes a bobbin made of an insulating material mounted on a core, in which said first winding and said second winding and said amplifying winding are wound to be insulated from each other, furthermore, a space for preventing discharge in said electrical leakage detecting transformer is provided between said first winding and said second winding through the bobbin, and said second winding and said amplifying winding are insulated by the bobbin.

5. The high voltage inverter device according to claim 4, wherein the transformer outputting the alternating-current high voltage is composed of a plurality of individual resonant transformers having same characteristics, excitation windings of said plurality of resonant transformers are connected in parallel or in series to be simultaneously excited, and output windings of said plurality of resonant transformers are connected in series or in parallel with each other.

6. The high voltage inverter device according to claim 5, wherein the switching element is arranged so that wiring distances between a drain terminal of the switching element and negative electrode side terminals of the excitation windings are equal.

7. The high voltage inverter device according to claim 4, wherein the number of turns of said amplifying winding is one thousand turns to three thousand turns.

8. The high voltage inverter device according to claim 4, wherein said first winding of said electrical leakage detecting transformer is interposed in said one of the output lines on a side where current flows out between the point connected to the frame ground and said one of the ends of the output windings, and said second winding of said electrical leakage detecting transformer is interposed in said one of the output lines on a side where current flows into between the point connected to the frame ground and one of the pair of the output terminals.

* * * * *